United States Patent [19]

Hayakawa

[11] Patent Number: 4,940,203
[45] Date of Patent: Jul. 10, 1990

[54] LEG PAD AND SPIKE FOR TRIPOD

[75] Inventor: Junichi Hayakawa, Tokyo, Japan

[73] Assignee: Velbon International Corporation, Torrance, Calif.

[21] Appl. No.: 360,998

[22] Filed: Jun. 2, 1989

[51] Int. Cl.⁵ .............................................. F16M 11/20
[52] U.S. Cl. .................... 248/188.9; 248/156; 135/84; 182/109
[58] Field of Search ............... 248/188.8, 188.9, 545, 248/156, 288.3, 530, 532, 533, 168; 182/108, 109; 135/77, 80, 84, 81

[56] References Cited

U.S. PATENT DOCUMENTS

| 710,074 | 9/1902 | Pratt | 135/84 |
| 2,376,282 | 5/1945 | Schroeder | 135/81 |
| 2,753,586 | 7/1956 | Metz | 248/188.9 |
| 3,208,707 | 9/1965 | Blumrich | 248/188.9 |

Primary Examiner—Alvin C. Chin-Shue
Attorney, Agent, or Firm—Beehler & Pavitt

[57] ABSTRACT

An improved tripod includes a spike and pad structure for supporting the tripod on the ground. The spike is fixed to the bottom portion of the leg and at an angle with respect thereto and is threaded to receive a spherical ball. Gripping the ball is a pad element, the ball including a groove and the pad including a nubbin received in the groove. Thus, the pad is free to tilt arcuately with respect to the spike and when rotated, the pad also rotates the ball thus allowing the pad to extend beyond the spike or to position the spike within the pad.

10 Claims, 1 Drawing Sheet

LEG PAD AND SPIKE FOR TRIPOD

FIELD OF THE INVENTION

The present invention relates to tripods and more particularly to an improved tripod in which the legs thereof include novel and unique ground engaging pads which include a spike and a pad such that the tripod may be used on relatively level surfaces or inclined surfaces such that either the spike or pad may be used to keep the tripod in a relatively level orientation.

RELATED APPLICATIONS AND PATENTS

Reference is made to U.S. application Ser. No. 07/338,296, filed on Apr. 14, 1989 and assigned to the same assignee as an example of a tripod structure with which the present invention may be used, although the present invention is not limited thereto.

BACKGROUND OF THE INVENTION

Tripods having a panhead thereon have been used for video and photographic camera support devices. Typically these pods include three legs oriented at 120 degrees and are collapsible such that when not in use the tripod may be collapsed into a small package. Normally the legs are collapsible in a telescoping fashion such that the lower leg is received in a mid leg and the lower and mid legs are telescoped into an upper leg which is mounted to a structure on which a panhead is mounted and on which in turn a camera is mounted.

Tripods are typically used to support a camera at a low or high distance off the ground which is related to the length of the telescoping legs. Two different problems are involved, one relating to supoort on no-even surfaces and the other related to what is sometimes referred to as low angle location of the camera, i.e., relatively close to the ground in which two of the three telescoping lengths of each of the legs are in a retracted position.

Generally the legs include a ground engaging foot or pad which may be a resilient pad or a spike or both. The pad is typically used on hard surfaces and the spike is used on surfaces into which the spike may at least partially imbed itself to fix the position of the tripod.

Several problems exist with the feet or foot of the prior art tripods, as follows. In one foot structure, a spike is oriented axially and fixed with respect to the associated leg. Mounted on the threaded spike is a ball element on which is mounted a pad element. The ball is threaded to mate with the threads of the spike and the pad grips the ball. In one form of operation the ball and pad are rotated towards the supporting leg such tht the spike protrudes beyond the end face of the pad to engage the surface, but at an angle which is essentially the angular orientation of the leg with respect to the surface beneath the leg. Typically in the fully radially extending orientation of the legs this is at an angel of between 20 and 30 degrees and usually about 27 to 28 degrees. The pad, however, includes and angled top surface and an equally angled bottom surface such that the inner portion of the pad which is oriented towards the center of the tripod is of a vertical dimension greater than the outer portion of the pad which is oriented outwardly of the center of the tripod. The result of this foot-pad geometry is that in certain orientations of the tripod on uneven ground, it is necessary to rotate the pad so that the inner and outer portions of each of the pads is inside and outside with respect to the center of the tripod in order for the entire bottom surface of the pad to be in contact with the supporting surface. If this manual positioning of each of the pads is not performed, then each of the pads engage the opposing support surface only along a relatively small portion of the bottom surface of the pad, i.e., the entire bottom surface of the pad is not in contact with the supporting surface. The result is that the tripod is not stable.

In another form of prior device, a ball element is mounted in the leg such that the center axis of the ball is axially aligned with the leg. The ball element in the leg supports a second ball element which is pivotable and on which is mounted a foot. No spike is present in this structure. The difficulty with this structure is that the ability of the foot and the pad mounted on the foot to rotated inwardly is limited and is much less than the outward rotation of the foot and associated pad. The result is that if it is needed for the foot and pad to rotate inwardly an amount greater than the outward rotation in order for the foot and pad to engage the supporting surface, it cannot be achieved. The other disadvantages are the absence of a spike and the inability to provide a stable structure at low angles of tripod use.

Yet another prior structure is that in which a ball element is mounted on the leg such that a pad mounted on the ball may pivot but cannot rotate with respect to the ball. In this structure, there is no spike.

Still another prior device includes a spike oriented at an angle with respect to the axis of the leg and which includes a pad. In this structure, the pad cannot be oriented angularly with respect to the spike and can only be threaded axially with respect to the spike to expose the latter.

It is apparent from the above that a need exists for an improved leg and pad structure for a tripod in which both a spike and pad are provided such that either the spike or pad may be used on even or uneven ground and either of which are operative to provide stabilizing support.

BRIEF DESCRIPTION OF THE PRESENT INVENTION

The present invention provides an improved tripod structure for support of a camera, be it photographic or video, in which the structure of the legs and the bottom leg portion thereof includes a spike and an associated pad, either of which may be used to contact the ground supporting structure.

The improved tripod of this invention includes a spike fixedly mounted to the bottom leg of a tripod, the spike being threaded. Mounted on the spike a spherical ball having a threaded aperture therein which is mounted on the threaded spike. The ball include a groove extending along a portion of the outer periphery thereof and generally oriented along the same axis as the spike but spaced radially therefrom.

The lower leg structure also includes a pad which is mounted on the ball. The pad is essentially symmetrical in configuration. The pad includes a nubbin which mates with the groove on the ball such that the pad may pivot with respect to the ball, but which is not free to rotate without rotating the ball relative to the spike.

In use, the pad may be retracted by rotating the pad on the axis of the spike along with the ball to expose a sufficient amount of the spike which then engages the opposing ground supporting structure. One or more spikes may be thus used. In another mode of operation, one or more of the pads may be extended such that the ground engaging face thereof extends beyond the end of the spike to engage the ground. Since the pad is free to pivot in all directions relative to the axis of the spike and the ball, the bottom face of the pad is in the proper ground engaging position such that the entire bottom face of the pad engages the ground without the need to rotated the pad in the proper orientation. This is so because the bottom and top surfaces of the pad are symmetrical in the sense that they are essentially parallel.

One benefit of this arrangement is that there is always assured a sufficient arcuate movement inside and outside of the pad relative to the ball and 360 degrees with respect to the ball and the spike regardless of the orientation of the pad. If more arcuate movement is needed, all that is necessary is to unscrew the pad axially with respect to the end of the tripod leg, an operation which is much easier than turning the pad such that an uneven bottom end thereof is in the proper orientation.

It is thus apparent that the structure of the present invention offers advantages not achieved by the prior devices. The details thereof are set forth in the following detailed description taken in conjunction with the accompanying drawings and which are to be considered as descriptive thereof but not limiting the same to the specific form illustrated.

DETAILED DESCRIPTION OF THE INVENTION

Figure 1:
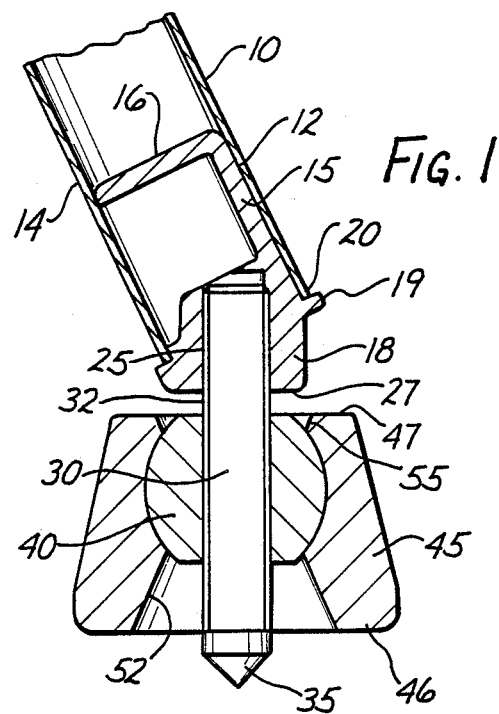
FIG. 1 is a view partly in section and partly in elevation of the bottom leg structure of a tripod in accordance with this invention.
Figure 2:
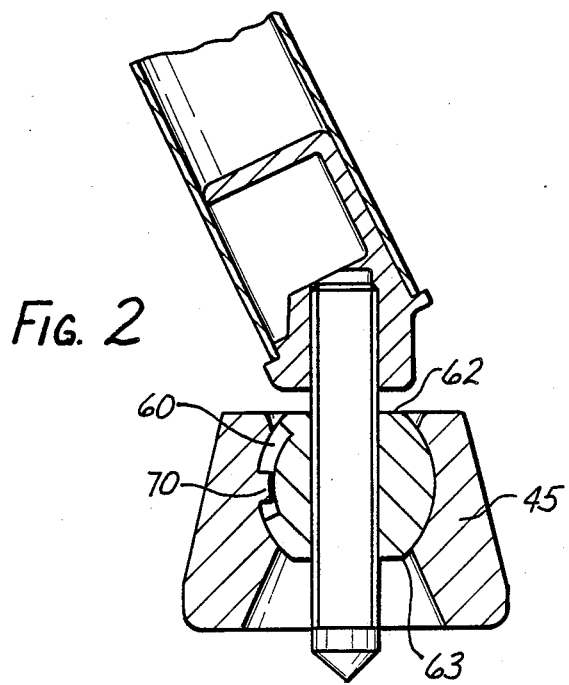
FIG. 2 is a view partly in section and partly in elevation showing the details of the ball and pad structure of the leg structure of a tripod in accordance with this invention.

Referring to the drawings which illustrate a preferred form of this invention, FIGS. 1 and 2 illustrate a portion of the leg 10 of a tripod, the latter normally including three legs which are collapsible axially and which can be folded radially inwardly towards each other to form a smaller profile. Since these details are well known, they are not illustrated.

The leg 10 is hollow at the lower end thereof and may be of any of a number of cross-sectional shapes such as circular, polygonal, square, rectangular or triangular, for example. The leg 10 includes a longitudinal axis which generally is oriented at an angle with respect to the surface on which the tripod is mounted, although that axis is generally the center axis of the leg. As shown, 12 is the outer surface of the leg and 14 is the inner surface of the leg, these orientations generally being with respect to directions in which the legs are moved radially from a collapsed to a radially unfolded position.

Fixed in the lower end of the leg 10 is a mounting element 15 in the form of mounting having a cross-member 16 at the top to provide transverse support at the lower end of the leg and a lower cross-member 18, the latter provided with a flange 19 which engages the end 20 of the leg 10. The lower cross-member provides transverse support at the end of the leg. In the form illustrated the mounting element 15 is a one piece structure, although other structures may be used. The mounting element is fixed to the leg by swaging or other suitable means such that the lower cross-member 18 is fixed both axially and radially with respect to the leg.

The mounting element 15 includes an aperture 25 therein, the axis of the aperture being at an angle with respect to the axis of the leg. The angle is preferably such that it is inclined radially inwardly with respect to the collapsed position of the leg. Thus in the collapsed position of the legs, the apertures 25 in each of the legs are pointed inwardly towards each other. As illustrated, each of the mounting elements 15 includes a lower face 27 which is spaced from and essentially non-parallel with the longitudinal axis of the leg in the form illustrated.

Received within the aperture 25 is a spike element 30, the latter being secured against rotation with respect to the mounting element 15. At least the portion of the spike element 30 extending beyond the lower face 27 of the mounting element is externally threaded as indicated at 32. The spike 30 includes an non-threaded pointed end 35 for engagement with the opposing ground or other surface such as carpet and the like, the term "ground" meaning that surface upon which the tripod is mounted.

Threadably received on the spike 30 is an internally threaded spherical ball element 40, the latter having an axial dimension less than the axial dimension of the spike which extends beyond the lower face 27 of the mounting element. Thus, the ball element 40 can be threaded up and down the axis of the spike 30 and travels axially at an angle with respect to the axis of the leg 10. Mounted on the ball is a pad element 45, the latter having a lower face 46 and an upper face 47, as shown.

The pad element is preferably of a resilient material such as rubber and the like and essentially completely surrounds the outer spherical surface of the ball element. In the form illustrated, the upper face 47 is essentially parallel to the lower face 46, the latter being the ground engaging surface when the pad is extended beyond the end 35 of the spike. The pad is also essentially symmetrical in outer configuration, as illustrated.

Normally, the upper face 47 of the pad is spaced from the lower face 27 of the mounting element 15. The spacing between these faces determines the extent of angular tilt of the pad with respect to the axis of the spike, i.e., the greater the space the greater the tilt angle in any location in a 360 degree orientation. As will be described, the pad 45 is free to tilt in any direction such that the bottom or lower face 46 contacts the ground. Due to the wide angle of tilt, the lower internal surface 52 of the pad diverges from the bottom of the ball element 52 to the lower face 46. Similarly, the upper internal surface 55 of the pad diverges from the top of the ball to the top or upper surface 47 of the pad.

As illustrated in FIG. 2, a portion of the outer surface of the ball includes a groove 60 which extends in an essentially axial orientation along the outer surface thereof between the top 63 and bottom 63 thereof, as shown. The internal face of the pad is configured to match the outer spherical surface of the ball and to grip the same. To assure rotational gripping between the pad 45 and the ball, the inner surface of the pad includes a nubbin 70 which is received in the groove 60 of the ball. This allows the pad to tilt arcuately with respect to the ball and with respect to the spike. However, the nubbin 70 locks the pad 45 to the ball such that rotation of the pad 45 also causes rotation of the ball and screwing or unscrewing the ball on the threaded spike.

Depending on how the tripod is used, one or more of the pads may be screwed towards the bottom of the leg to expose the end of the spike which is then able to lock into the ground surface. Alternately, one or more of the pads may screwed away from the leg such that the bottom end 46 of the pad extends beyond the end of the spike. In this mode, the pad is able to tilt arcuately so as to conform to the plane of the ground. Each pad is independently tiltable and the pads need not be rotated to assure that the proper side of the pad is located properly as is the case with some of the prior devices previouly described.

The overall result is a tripod structure in which either the spike or the pad may be used as the ground engaging element. This allows all of the pads or all of the spikes or some of the pads and some of the spikes to be used at that same time depending on conditions and provides firm support for the tripod without the need any other operation other than to expose one or more spikes, as may be desired. As previously noted, the further away the top surface 47 of the pad is from the bottom of the mounting member, the greater arcuate movement because of the greater clearance.

It is thus apparent that a much improved and simpler tripod structure is provided which is simpler to manufacture and to use. The ability to use either the spike or the pad, and to provide for self-adjustment of the pad offers not only simplicity in operation, but versatility and reliability.

What is claimed is:

1. An improved foot structure for a tripod for use in supporting a camera and the like comprising:
   at least one leg having a longitudinal axis and a lower portion which is tubular,
   means in the lower portion of said leg fixedly supporting a threaded spike oriented at an angle with respect to the axis of said leg,
   a spherical ball element mounted on said threaded spike,
   said ball element having an aperture therein and being threaded to mate with the threads of said threaded spike,
   a pad element mounted on said ball and including an upper surface spaced from the lower portion of said leg and a lower surface adapted to engage the ground, and
   means on said ball element and said pad to permit arcuate movement of said pad with respect to said ball and to effect rotation of said ball with respect to said spike as said pad is rotated.

2. An improved foot structure for a tripod for use in supporting a camera and the like as set forth in claim 1 wherein the axial dimension of said pad being greatet than the axial dimension of said ball element, and
   the axial dimension of the portion of said spike extending beyond the lower end of said leg being greater than the axial dimension of said pad.

3. An improved foot structure for a tripod for use in supporting a camera and the like as set forth in claim 1 wherein said means in the lower portion of said leg includes a bottom surface spaced from the lower portion of said leg.

4. An improved foot structure for a tripod for use in supporting a camera and the like as set forth in claim 1 wherein said pad includes an arcuate opening at the top and bottom thereof to permit said pad to tilt arcuately relative to said spike.

5. An improved foot structure for a tripod for use in supporting a camera and the like as set forth in claim 1 wherein the top and bottom surfaces of said pad are in essentially parallel relationship.

6. An improved foot structure for a tripod for use in supporting a camera and the like as set forth in claim 2 wherein the top and bottom surfaces of said pad are essentially in spaced parallel relationship.

7. An improved foot structure for a tripod for use in supporting a camera and the like as set forth in claim 1 wherein said means on said ball element includes a groove extending axially along the outer surface of said ball.

8. An improved foot structure for a tripod for use in supporting a camera and the like as set forth in claim 7 wherein said means on said pad includes a nubbin received in the groove of said ball element.

9. An improved foot structure for a tripod for use in supporting a camera and the like as set forth in claim 1 wherein said pad is symmetrical in configuration.

10. An improved foot structure for a tripod for use in supporting a camera and the like as set forth in claim 1 in which in one position of said pad the spike is retracted within said pad and in another position of said pad the end of the spike extends beyond the lowe surface of said pad.

* * * * *